US006926582B2

(12) United States Patent
Beckle et al.

(10) Patent No.: US 6,926,582 B2
(45) Date of Patent: Aug. 9, 2005

(54) SYSTEM AND METHOD FOR ROUNDING DISK DRIVE SLIDER CORNERS AND/OR EDGES USING A FLEXIBLE SLIDER FIXTURE, AN ABRASIVE ELEMENT, AND SUPPORT ELEMENTS TO CONTROL SLIDER ORIENTATION

(75) Inventors: Karl Frank Beckle, Gilroy, CA (US); Michael William Chaw, San Jose, CA (US); Richard H. Koch, Cupertino, CA (US); Mark Clinton Thurber, San Jose, CA (US); Bruno Alejandro Valdes, Santa Clara, CA (US)

(73) Assignee: Hitachi Global Storage Technologies Nethrlands B.V., Amsterdam (NL)

( * ) Notice: Subject to any disclaimer, the term of this patent is extended or adjusted under 35 U.S.C. 154(b) by 533 days.

(21) Appl. No.: 10/123,320

(22) Filed: Apr. 16, 2002

(65) Prior Publication Data

US 2003/0192167 A1 Oct. 16, 2003

(51) Int. Cl.[7] .................................................. B24B 7/22
(52) U.S. Cl. .............................................. 451/5; 451/28
(58) Field of Search ............................... 451/5, 41, 44, 451/28, 55, 364, 388

(56) References Cited

U.S. PATENT DOCUMENTS

| 5,301,077 | A | * | 4/1994 | Yamaguchi et al. ..... 360/236.7 |
| 5,321,882 | A | | 6/1994 | Zarouri et al. |
| 5,516,323 | A | | 5/1996 | Carlson et al. |
| 5,525,091 | A | * | 6/1996 | Lam et al. ...................... 451/1 |
| 5,745,983 | A | | 5/1998 | Quintana et al. |
| 6,040,959 | A | | 3/2000 | Kobayashi et al. |
| 6,045,431 | A | * | 4/2000 | Cheprasov et al. ............. 451/5 |
| 6,162,114 | A | | 12/2000 | Kobayashi et al. |
| 6,276,991 | B1 | * | 8/2001 | Kobayashi et al. ............ 451/28 |

FOREIGN PATENT DOCUMENTS

| EP | WO 00/43992 | 7/2000 |
| JP | 2108290 | 4/1990 |
| JP | 3256214 | 11/1991 |
| JP | 4106713 | 4/1992 |
| JP | 4322961 | 11/1992 |
| JP | 5266453 | 10/1993 |
| JP | 5282641 | 10/1993 |
| JP | 6126604 | 5/1994 |
| JP | 6162431 | 6/1994 |
| JP | 08-203050 | 8/1996 |
| JP | 11016115 | 1/1999 |
| JP | 11219574 | 8/1999 |
| JP | 2301014 | 12/1999 |
| JP | 11339237 | 12/1999 |
| JP | 2000-084816 | 3/2000 |
| JP | 2000-94292 | 4/2000 |
| JP | 2000-094294 | 4/2000 |
| JP | 2000-167766 | 6/2000 |
| JP | 2000-293828 | 10/2000 |

OTHER PUBLICATIONS

R. N. Woolston, *Lapping Edge Blending Technique*, IBM Technical Disclosure Bulletin, Apr. 1976, vol. 18, p. 3779, n. 11.

\* cited by examiner

*Primary Examiner*—Robert A. Rose
(74) *Attorney, Agent, or Firm*—Bracewell & Giuliani LLP

(57) ABSTRACT

A system and method for burnishing the edges and corners of hard disk drive sliders uses a combination of flexible tape fixturing and mechanical protrusions located beneath the tape to systematically orient selected slider corners and edges to be exposed to an abrasive in a flexible manner. This solution carefully exposes the sliders even when there is very little clearance between the sliders. A variety of different rounding geometries are achieved by customizing the protrusions underneath the flexible tape. Multiple slider corners and/or edges are exposed to the abrasive at one time for bulk processing. The sliders are oriented in such a way that sensitive structures located on the air bearing surfaces of the sliders are not harmed during burnishing.

14 Claims, 3 Drawing Sheets

SYSTEM AND METHOD FOR ROUNDING DISK DRIVE SLIDER CORNERS AND/OR EDGES USING A FLEXIBLE SLIDER FIXTURE, AN ABRASIVE ELEMENT, AND SUPPORT ELEMENTS TO CONTROL SLIDER ORIENTATION

BACKGROUND OF THE INVENTION

1. Technical Field

The present invention relates in general to an improved means of processing sliders for hard disk drive read/write heads, and in particular to an improved means of reducing damage to and contamination of hard disk drives, especially during load/unload operations of the sliders on the disks, but also potentially during any other conditions that may cause slider-disk contact.

2. Description of the Prior Art

In hard disk drives, the use of load/unload (L/UL) designs has become increasingly popular. In L/UL designs, the slider is "loaded" down a ramp onto the spinning disk prior to any data reading and writing operations, and "unloaded" off of the disk back onto the ramp when the reading and writing operations are complete. This approach reduces the problems of head-disk stiction and media damage from shock as the fly height (e.g., the height at which a slider flies above the surface of a spinning disk) continues to decrease. These designs also have the advantage of reducing power consumption.

However, due to high disk and load/unload speeds, L/UL schemes potentially risk media damage from slider-disk contact during loading and/or unloading. Research has shown that this damage is specifically associated with the sharp corners and/or edges of the block-like sliders digging into the disk surface upon impact. The resulting damage in the L/UL zone of the disk makes this region unsuitable for data storage, thereby reducing the overall storage capacity of the drive by 5 to 15%. In addition, the particles or debris that are created during the slider-disk impacts may decrease the overall reliability of the drive.

The problem of disk damage during L/UL can be reduced by designing the air bearing, suspension, ramp, and disk drive parameters (e.g., disk and L/UL speeds) such that head-disk contact is eliminated or reduced. Alternatively, the slider itself can be processed in such a way that any contact that does occur causes no damage or an acceptably small amount of damage to the disk. Rounding (which also is referred to as "blending") slider corners and/or edges so that no sharp points (regions of high stress concentration) are presented to the disk surface during contact, is a demonstrated way to reduce disk damage from L/UL. Slider corner and/or edge rounding may have the added benefit of reducing disk damage associated with mechanisms other than L/UL, such as reading or writing in the presence of operational shock, disk defects, or particles. By reducing the severity of slider-disk impacts, corner and edge rounding can additionally reduce particle generation in the drive, and thereby improve drive reliability. Yet another benefit might result from rounding, smoothing, or chamfering the rough, saw-cut edge of the slider and removing any poorly-attached particles that would otherwise be released into the drive upon contact.

In the prior art, a number of mechanical techniques have been used to produce rounded corners and edges on sliders. For example, the exposed corners and/or edges of a slider have been burnished, one at a time, with abrasive plates or abrasive tape that has been stretched over the slider. Methods which are directed to processing individual ones of the sliders were popular when slider form factors were larger and throughput constraints were not as rigorous.

Another prior art method attempted bulk rounding of single flat rows of sliders that were parted or semi-parted. The abrasive tape is presented at an angle to the single row of sliders or, equivalently, the slider or row is presented at an angle to the tape. If ample clearance is provided between the rows of sliders, this technique allows the tape to comply around the slider corners and edges. Rubbing or vibratory motion of the abrasive tape relative to the slider or row burnishes the corners and edges. Japanese Publication Nos. JP2000094292-A and JP2000094294-A, are directed to methods of this type. In these approaches, a row of sliders that is placed in a rigid holder (probably the transfer tool on which the sliders were parted) is pushed by a load addition unit onto a rubber-backed abrasive sheet at an angle. Wires extending between the sliders push and deform the abrasive sheet into the clearances between the completely flat array of sliders to enable beveling of the slider edges.

Each of these prior art methods of burnishing slider corners and edges have significant disadvantages. The single slider methods are too slow to allow cost-effective bulk manufacturing. The cost and throughput considerations generally mandate placing sliders as close together as possible on a row. With such limited clearances, it is very difficult to burnish between the rows of sliders on a rigid fixture, even if the wires of the two Japanese publications are used to push the abrasive sheet into these spaces. Bulk rounding on a rigid fixture is inflexible. Depending on the particular row or slider configuration, sensitive structures may be damaged by the mechanical action of the abrasive due to their unavoidable proximity to such structures. Implementation of bulk rounding on a rigid fixture is complex and expensive, and is only cost-effective for a particular manufacturing process (e.g., one in which rows are parted into sliders with relatively large clearances on a rigid transfer tool). Moreover, these methods have no ability to adjust individual slider orientations to provide flexible rounding geometries, and they only work with sufficiently large slider kerf.

Still other prior art, alternative methods that have been used for slider corner/edge rounding have included crowning sliders with elevated rim caps (see International Publication No. WO200043992-A1), laser melting or ablation, and rounding using mechanical or chemical etching. The latter method is proposed in Japanese Patent No. JP11219574-A, wherein a thin film magnetic head slider structure has a small curved surface formed on a flotation surface of the slider by ion milling or dry etching.

Unfortunately, each of these approaches also has significant problems. Methods that utilize lasers are generally hampered by the creation of melted and re-solidified material around the melted or ablated area. This "slag" material can often protrude significantly above the rest of the surface, making the resulting sliders unusable given the extremely small slider-disk separations in a disk drive. In addition, it is very difficult to control the rounding produced by laser melting or ablation to the tolerances required. The shapes produced by etching processes are also difficult to accurately control. In addition, both laser and etching processes most easily produce tapered corners or edges rather than the more rounded profiles that are most effective at reducing disk damage. The depths that are readily achievable with some etching processes are limited by constraints of sample heating, depending on the tool and part configurations.

Finally, etching processes are not as effective as mechanical burnishing processes in reducing roughness in the rounded regions of sliders. Thus, a mechanical burnishing apparatus and method that can more easily produce slider corner/edge profiles that are smoother, more controllable, and rounded than laser or etching approaches would be highly desirable.

SUMMARY OF THE INVENTION

One embodiment of a system and method for burnishing the edges and corners of hard disk drive sliders uses a combination of flexible tape fixturing and mechanical protrusions located beneath the tape to systematically orient selected slider corners and edges to be exposed to an abrasive element in a flexible manner. This solution can carefully expose the sliders even when there is very little clearance between the sliders. A variety of different rounding geometries can be achieved in a straightforward manner by customizing the protrusions underneath the flexible tape. The compliance of the abrasive element also can be changed in conjunction with the protrusions to modify the rounding achieved. Multiple slider corners and edges can be exposed to the abrasive at one time for bulk processing. Finally, the sliders can be oriented in such a way that sensitive structures located on the air bearing surfaces of the sliders are not harmed during burnishing.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above maybe had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PREFERRED EMBODIMENT OF THE PRESENT INVENTION

Figure 1:
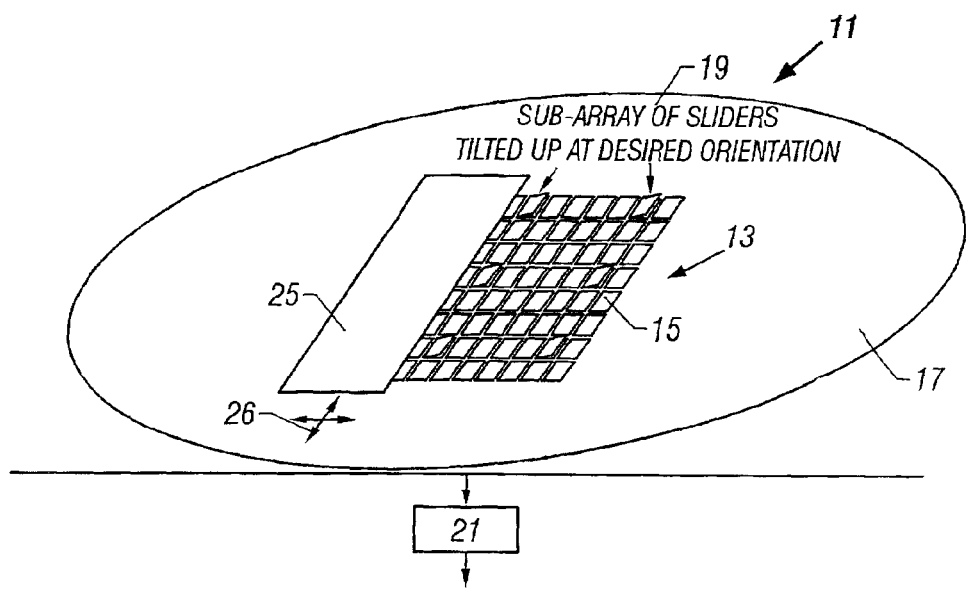
FIG. 1 is an isometric view of one embodiment of a disk drive slider burnishing system constructed in accordance with the present invention.

Referring to FIG. 1, a schematic illustration of a disk drive slider manufacturing system, process, and apparatus 11 is shown. Apparatus 11 is designed to selectively burnish and/or round the corners and edges of a large number or array 13 of sliders 15 in a high throughput manufacturing environment. Each slider 15 is fixtured on a flexible adhesive tape 17 with its air bearing surface (ABS) facing away or upward from the planar surface of tape 17. Note that slider 15 also could be fixtured with the ABS facing downward onto tape 17 if it were desired to round the opposite side, or "flex side," corners and edges, e.g., for the purpose of reducing particle generation in the drive from these corners and edges. Tape 17 is readily compliant and allows a series of small rigid support elements or protrusions 23 on a support platform 24 (see FIG. 2) to precisely manipulate selected ones or a sub-array 19 of sliders 15 at desired orientations. Sub-array 19 includes one or more of the sliders 15 in array 13.

Figure 2:
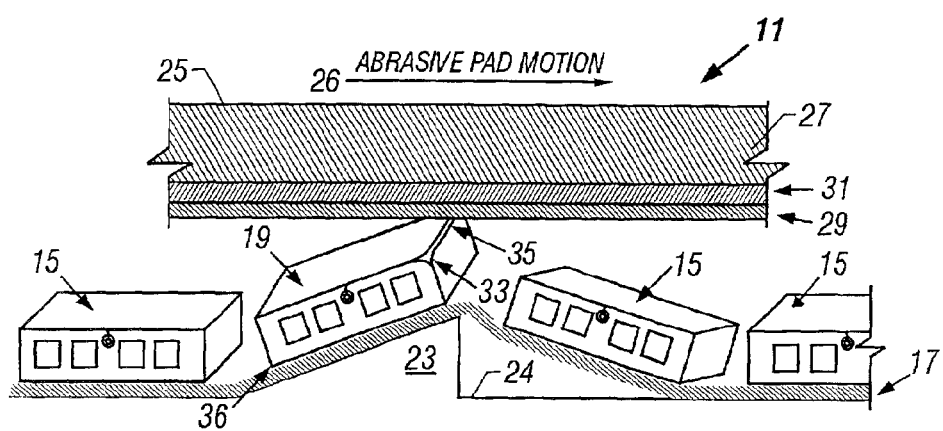
FIG. 2 is an enlarged elevational view of the system of FIG. 1.

Protrusions 23 are rigid structures that are located beneath tape 17, on the opposite side of the tape from sliders 15. Protrusions 23 deform tape 17 and, thus, move sliders 15 of sub-array 19 when brought into proximity therewith. In FIG. 2, one possible implementation for apparatus 11 is shown. In FIG. 2, each protrusion is a right triangle prism wedge 23 which is designed to tilt or pivot a single slider 15 in the sub-array 19, such as along one of its lower edges 36, as shown. When the sliders 15 of sub-array 19 are manipulated in this manner, their respective upper edges 35 and corners 33 are elevated above those of the remaining sliders 15 in array 13. The exposed edges 35/corners 33 of sliders 15 in sub-array 19 are then precisely burnished by an abrasive element or pad 25. Abrasive element 25 also may comprise, for example, a belt, a reel-to-reel tape, a grinding wheel, or other apparatus.

In the greatly simplified illustration of FIG. 1, the array 13 contains 64 sliders 15. Sub-array 19 includes six sliders 15 having side edges that are pivoted or tilted up relative to the remaining stationary, co-planar oriented sliders 15. A vacuum 21 applied beneath tape 17 (e.g., through apertures in platform 24) holds tape 17 against protrusions 23. Abrasive pad 25 moves above fixture tape 17 to burnish selective portions of the sliders 15 in sub-array 19 that have been manipulated by protrusions 23. Arrows 26 illustrate some of the possible directions of relative movement between tape 17 and pad 25. Pad 25 preferably comprises a laminate of hard backing or block 27, an abrasive thin film 29, and a compliant backing material 31 sandwiched therebetween. Film 29 typically incorporates particles of diamond or another very hard material.

The specific orientations of the sliders 15 in sub-array 19 (as determined by protrusions 23) expose the desired corners 33 and/or edges 35 of sliders 15 to burnishing pad 25. System variables such as angles, pressure, and abrasive material compliance can be varied to control the specific corner 33/edge 35 geometries achieved. By varying the tilt angles of sliders 15, it is possible not only to create the desired corner/edge rounding, but also to protect any sensitive features of the slider, such as the ABS, from damage. Flexible fixturing tape 17 can be indexed relative to protrusions 23 so that all desired slider corners/edges are processed after the required number of steps in the manufacturing sequence.

Figure 3:
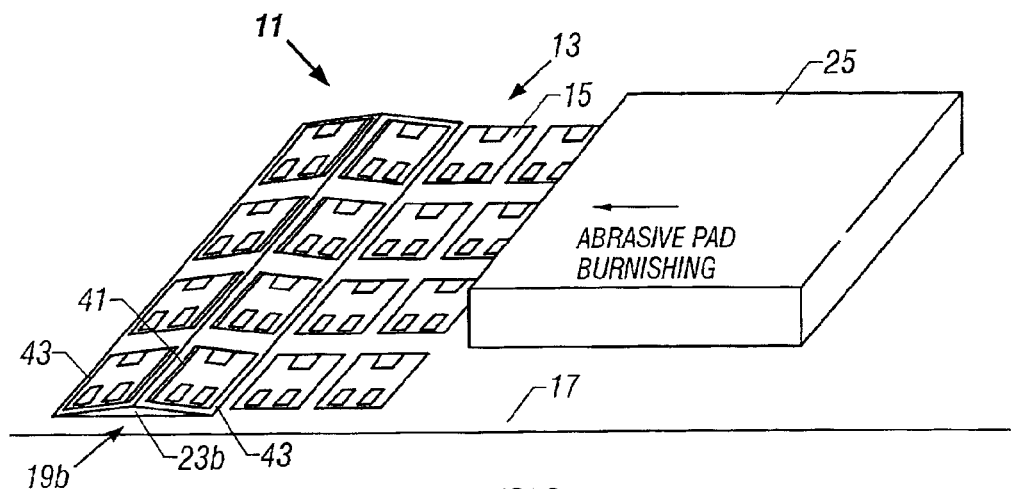
FIG. 3 is an isometric view of the system of FIG. 1 burnishing a whole column of sliders.

Referring now to FIG. 3, a second implementation for apparatus 11 is shown to illustrate another one of the many possible configurations of sub-array 19 wherein sliders 15 are pushed up to achieve various results. In FIG. 3, a pair of selected columns of sliders 15 comprise sub-array 19b. In this version, an obtuse-angled, isosceles triangle prism or protrusion 23b is used to symmetrically elevate the upper adjacent edges 41 of adjacent columns of sliders 15. When pad 25 is actuated, this sequence results in simultaneous burnishing of one side edge 41 on each slider 15 in sub-array 19b, as they are pivoted about their respective lower side edges 43.

Figure 4:
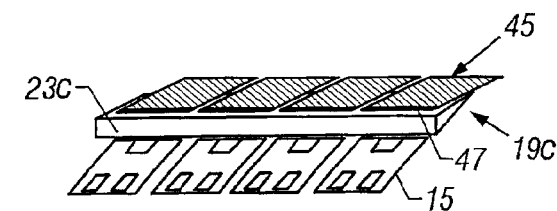
FIG. 4 is an isometric view of a portion of the system of FIG. 1 burnishing a whole row of sliders.
Figure 5:
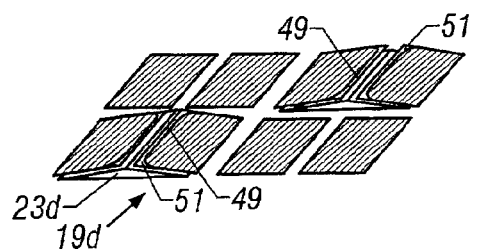
FIG. 5 is an isometric view of a portion of the system of FIG. 1 performing two-edge burnishing of the sliders.
Figure 6:
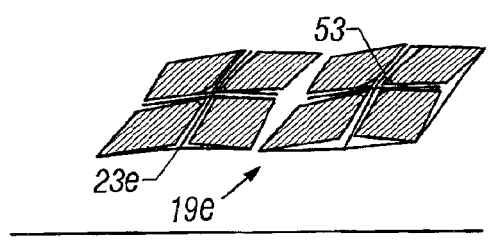
FIG. 6 is an isometric view of a portion of the system of FIG. 1 performing four-corner burnishing of the sliders.

A few other possible implementations for apparatus 11 are schematically illustrated in FIGS. 4–6. For example, in FIG. 4, a single row of sliders 15 comprises sub-array 19c. In this version, protrusion 23c comprises an elongated, right triangle prism wedge 23c that is designed to tilt or pivot a row of sliders 15 in the sub-array 19c along their lower edges 45. When the sliders 15 of sub-array 19c are manipulated in this manner, their respective upper edges 47 are elevated above those of the remaining sliders 15 in array 13. The exposed edges 47 of sliders 15 in sub-array 19c are then precisely burnished or rounded by abrasive pad 25. For whole-row burnishing, accurate placement of the wedge relative to the sliders is only required in one axis. This approach is especially effective for rounding of slider edges.

In FIG. 5, alternating or spaced-apart pairs of sliders 15 are manipulated by protrusions 23d so that their edges 49 and corners 51 may be burnished by pad 25. Protrusions 23d are similar to but shorter than protrusions 19b of FIG. 3. The additional space around each slider in combination with the compliance of the abrasive pad allows rounding of corners as well as edges. FIG. 6 depicts yet another example wherein efficient "four-corner" burnishing is accomplished with pyramidal protrusions 23e, each having four congruent sides. In this implementation of apparatus 11, one corner 53 of each slider 15 in sub-array 19e is rounded and/or burnished. Thus, each protrusion 23e elevates four adjacent corners 53 on subsets of four sliders 15 within the sub-array 19e. Combinations of the above or still other implementations allow corner and edge rounding that can be tailored to any particular functional requirements to be performed on the entire array 13 of sliders 15 in just a few steps.

Figure 7:
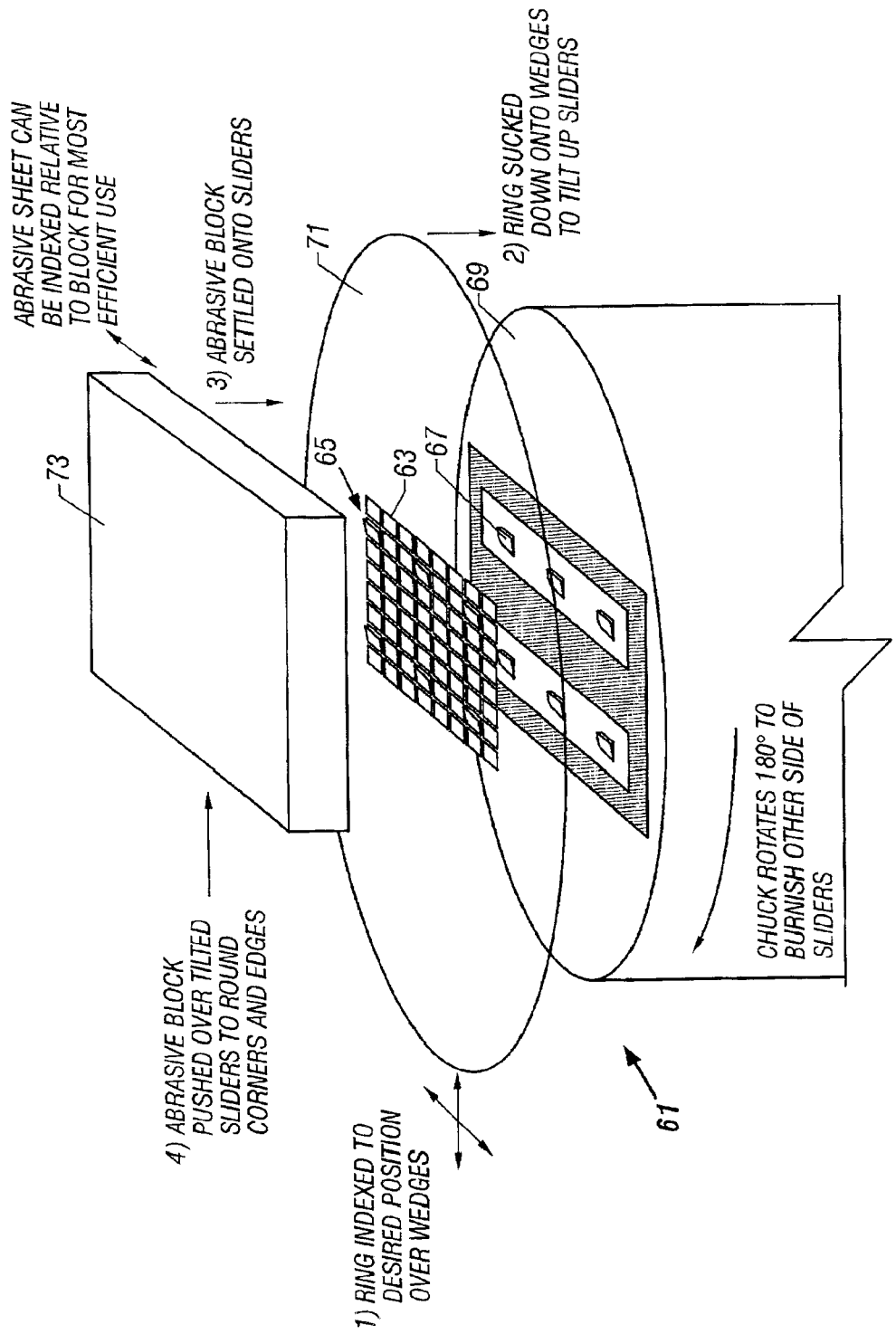
FIG. 7 is an exploded isometric view of one implementation of the system of FIG. 1.

Referring now to FIG. 7, a more detailed embodiment of a method and system of the present invention is illustrated in conjunction with a tool 61. Tool 61 is used to round the side edges and all four corners of each slider 63 in order to reduce disk damage in hard drives. In this version, a sub-array 65 of an array of the sliders 63 are tilted up at an angle of approximately 10 degrees relative to horizontal via wedges 67 on a vacuum chuck 69 that sucks down a tape fixture 71. An abrasive pad 73 (having rubber-backed polyester film with 0.1 μm embedded diamond particles) moves linearly over the exposed side edges of sliders 63 in sub-array 65, thereby rounding their side edges. In addition, because of the compliance of the backing on pad 73, two corners on each of these sliders 63 are also rounded. In a subsequent step, chuck 69 is rotated 180 degrees so that wedges 67 tilt up each slider 63 in the opposite direction to allow processing of the other side edges and corners of sliders 63.

Pressure by pad 73 on sliders 63 of sub-array 65 is controlled by exerting a specified force downward on pad 73. In this example, it is the weight of the block in pad 73 itself that provides sufficient force. A few other alternatives for providing force include a diaphragm or bladder for applying pressure to the abrasive, and applying a force to the chuck 69 or support platform itself to enhance the processing step. After all of the sub-arrays 65 are processed, the vacuum is released and tape fixture 71 is indexed to the next slider position and sucked down. For example, in one realized version of the present invention, rounding all four upper (ABS-side) edges and corners on each slider 63 in an overall array of approximately 1000 pico sliders requires 132 indexing steps, which takes approximately 30 minutes. This elapsed time could be reduced in other implementations by processing more sliders at one time and/or by increasing the speed of the indexing steps.

Because of the flexibility afforded by the combination of flexible tape fixturing and slider-manipulating protrusions, a number of variables maybe controlled, including: slider orientation (tilting up at specified angles slider side edges, leading or trailing edges, or corners), size of slider sub-array (e.g., 16 sliders at one time), backing compliance (e.g., 50 durometer soft rubber), and tilt angle (e.g., 10 degrees). As a result, accurate and precise rounding/burnishing requirements as well as large volume throughput requirements can be satisfied without causing any scratches on critical slider surfaces such as the ABS pads or sensitive areas around the head. Furthermore, the corners and edges of the sliders may be exposed to the abrasive even when there is very tight clearance (e.g., approximately 65 μm) between adjacent sliders.

The present invention has several advantages. While corner/edge rounding can provide significant functional benefits, it is difficult to implement in a cost-effective manner using traditional methods. The use of abrasive plates to "lap in" curvature on a single-slider basis is prohibitively expensive in a manufacturing environment due to its low throughput. The extremely precise dimensional requirements of such approaches for pico or femto-sized slider form factors also add to the cost. Row-level burnishing strategies are generally precluded since all slider corners and edges have yet to be defined at this early processing step in the manufacturing sequence. Even after parting or partial etching of a row into sliders, the narrow clearances between the sliders in manufacturing processes designed for high throughput tend to make the rounding of corners and edges very difficult.

The present invention describes a means of rounding slider corners and/or edges such that no sharp points (regions of high stress concentration) are presented to the disk surface during L/UL sequences or other events resulting in disk contact. As a result, disk damage in the L/UL zone of the disk is reduced or eliminated. By using the slider corner/edge rounding technique of the present invention, it is possible to produce disk drives that achieve higher storage density by making use of the L/UL zone for data storage. In addition, overall drive reliability and operational shock characteristics are improved.

The flexible tape slider fixture of the present invention allows for bulk processing and orientation of sliders at arbitrary angles. The backing chuck that incorporates protrusions, is shaped and positioned to elevate a sub-array of sliders at the desired orientations. A compliant abrasive pad or belt moves over the exposed sliders with linear, circular, and/or vibratory motion, thereby creating the desired rounding through abrasion of the slider corners and/or edges.

While the invention has been shown or described in only some of its forms, it should be apparent to those skilled in the art that it is not so limited, but is susceptible to various changes without departing from the scope of the invention.

What is claimed is:

1. A tool for processing disk drive sliders, each of the sliders having a surface with a plurality of edges and corners, the tool comprising:

a flexible fixture adapted to support the sliders;

an abrasive element located on one side of the flexible fixture;

a support platform located on another side of the flexible fixture opposite the abrasive element, wherein the platform has support elements that are adapted to precisely manipulate a plurality of the sliders through the fixture at a desired orientation such that the corners and edges of said plurality of the sliders are exposed to and processed by the abrasive element.

2. The tool of claim 1 wherein the flexible fixture is a sheet of adhesive tape.

3. The tool of claim 1 wherein the abrasive element is a device selected from the group consisting of a belt, a reel-to-reel tape, a grinding wheel, and a block with an abrasive-impregnated thin film; and wherein
the abrasive element is constructed with a desired compliance.

4. The tool of claim 1 wherein the support elements are prismatic wedges.

5. The tool of claim 1 wherein the support platform is a vacuum chuck for drawing the fixture to the platform.

6. A system for burnishing disk drive sliders, each of the sliders having an air bearing surface with a plurality of edges and corners, the system comprising:

a flexible tape fixture adapted to support and retain the sliders;

an abrasive element located on one side of the tape fixture;

a vacuum chuck located on another side of the tape fixture opposite the abrasive element for drawing the tape fixture to the chuck, wherein the chuck has protrusions that are adapted to precisely manipulate selected ones of the sliders through the tape fixture at desired orientations such that corners and edges of said selected ones of the sliders are exposed to and burnished by the abrasive element without harming sensitive structures on the air bearing surfaces.

7. The system of claim 6 wherein the flexible tape fixture is a sheet of adhesive tape.

8. The system of claim 6 wherein the abrasive element is a device selected from the group consisting of a belt, a reel-to-reel tape, a grinding wheel, and a block with an abrasive-impregnated thin film; and wherein
the abrasive element is constructed with a desired compliance.

9. The system of claim 6 wherein the protrusions comprise prismatic wedges.

10. A method of processing disk drive sliders, each of the sliders having an air bearing surface with a plurality of edges and corners, the method comprising:

(a) placing an array of sliders on a flexible fixture;

(b) securing the flexible fixture to a support platform such that support elements on the support platform precisely manipulate a sub-array of the array of sliders at a desired orientation; and (d) processing corners and/or edges of the sub-array of the array of sliders without harming sensitive structures on the air bearing surfaces.

11. The method of claim 10, further comprising the steps of releasing the flexible fixture, indexing the flexible fixture relative to the support platform, and re-engaging the flexible fixture to the support platform such that the sub-array of the array of sliders is reoriented in a different orientation to allow processing of other corners and/or edges of the sub-array of the array of sliders.

12. The method of claim 10 wherein step (b) comprises evacuating the support platform to draw the flexible fixture to the support platform.

13. The method of claim 10 wherein step (a) comprises placing the array of sliders on a flexible adhesive tape fixture.

14. The method of claim 10 wherein step (d) comprises processing the sub-array of the array of sliders with an abrasive element; and further comprising the step of:

applying force to one of the abrasive element and the support platform to enhance the processing of step (d).

* * * * *